June 22, 1937.   G. Q. BRITT   2,084,834
PISTON
Filed Sept. 16, 1936
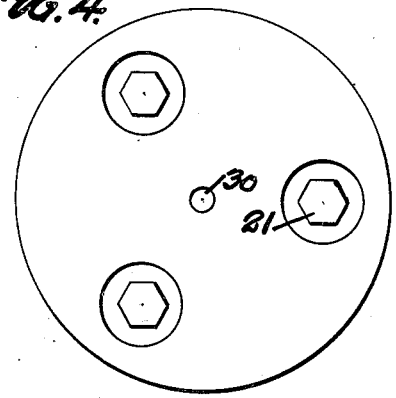
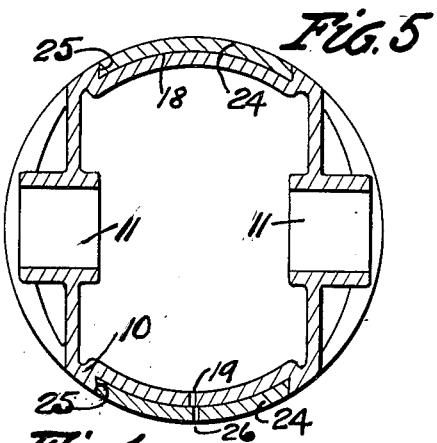
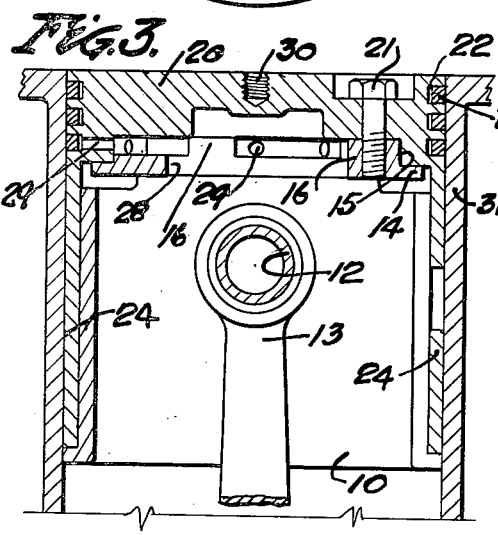
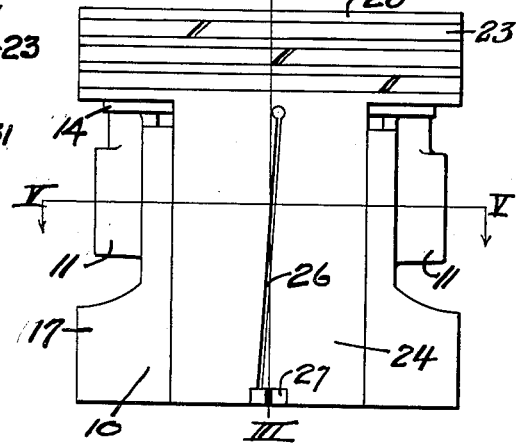
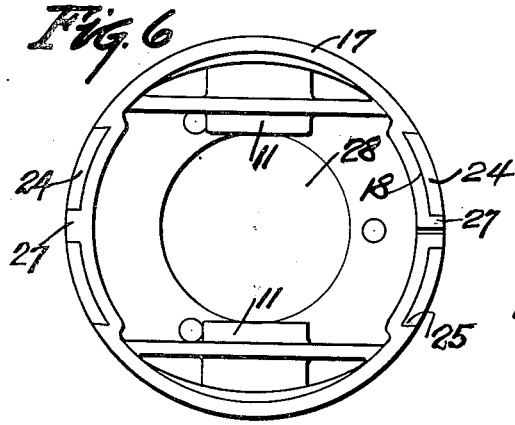
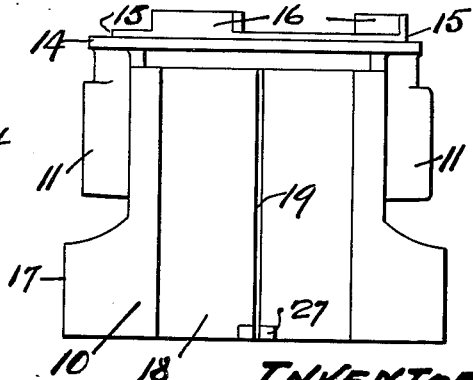
INVENTOR
GEORGE Q. BRITT.
by J. H. Weatherford
Atty.

Patented June 22, 1937

2,084,834

UNITED STATES PATENT OFFICE 2,084,834

PISTON

George Q. Britt, Memphis, Tenn.

Application September 16, 1936, Serial No. 101,147

6 Claims. (Cl. 309—15)

This invention relates to improvements in pistons particularly those designed for use in internal combustion engines.

In internal combustion engines, piston replacement is usually necessary because of broken or worn rings and also because those portions of the piston and of the cylinders which approach parallelism with the piston pin and take the thrust of the connecting rod, wear fastest and often to such an extent that reboring of the cylinder and replacement of the piston and rings becomes necessary. To accomplish any of these replacements, under present practice it is necessary to remove the cylinders from the crank case making the pistons accessible, or to go into the crank case and disconnect the connecting rods from the crank shaft, thereby enabling the pistons to be removed, the labor cost usually being more expensive than the replacement parts needed, the net result being that repair is generally neglected until serious damage has been done.

When a piston has been removed from the cylinder it is usual to replace not only the piston and the rings, but to also replace the piston pin which usually has had little wear. Since the cylinder receives almost no wear opposite the end of the piston pins an oval cylinder results, and it is often necessary to rebore the cylinder to permit the insertion of the oversized piston, which is usually substituted in such cases. It seems evident therefore, that replacement of the head of the piston with a head of the same size, and oversized rings, which readily adjust themselves to the slightly oval condition of the cylinder might be all that would be necessary, so far as leakage of gas past the rings is concerned, and except for the side slap of the pistons which the wear on the pistons and cylinders has caused, replacement of the heads would accomplish the result. It will also be evident that provided the head used in replacement carried with it, additional portions which extend along the worn portion of the pistons and were of sufficient thickness to compensate not only for the wear of the piston itself, but also for the wear on the cylinders that a satisfactory job could be thus obtained.

The objects of the invention are:

To provide a piston in which those parts which are subject to the most wear and which consequently are in greatest need of replacement are made accessible for such repair without the necessity of disturbing those parts of the engine in which repair is not usually necessary.

Specifically the primary object of the invention is to make a piston in which the head portion carrying the piston rings together with those portions of the skirt of the pistons most subject to wear, may be removed, from the cross head portion of such piston, for the purpose of either replacing the rings, or if necessary, replacing the entire head and such skirt portions without removing the cylinder or disturbing the connection of the cross head portion of the piston to the connecting rod, and/or without disconnecting the connecting rod from the crank shaft of the engine.

The means by which these and other objects are accomplished, and the manner of their accomplishment will readily be understood from the following description on reference to the accompanying drawing, in which,—

Fig. 1 is a side elevation of the piston.

Fig. 2 is a similar elevation of the cross head portion of the piston, which portion includes the bosses which carry the piston pin.

Fig. 3 is a sectional elevation on the longitudinal center line of the piston, taken at right angles to Fig. 1, showing the piston in place in the cylinder, a fragmentary portion of the cylinder walls only being shown.

Fig. 4 is a plan of the piston.

Fig. 5 is a section of the piston taken on the line V—V of Fig. 1.

Fig. 6 is an inverted plan view of the piston.

Referring now to the drawing, in which the various parts are indicated by numerals, 10 is a skeleton body forming the lower portion of the piston, which body includes integral bosses 11, which carry the piston pin 12 in usual manner. 13 is the upper end of the connecting rod which is shown only in Fig. 3. The upper end of this body is inwardly stepped to form a cylindrical boss 14 slightly reduced in diameter from the body, and an annular shoulder 15. 16 are bosses to receive head-attaching screws or bolts. At the lower end, the body includes a short cylindrical skirt 17 which however together with the side portions of the body subject to throw of the connecting rod, is channeled to form wide shallow recesses or grooves 18. The body in one or both of the grooves may be longitudinally slotted as at 19 to provide for expansion.

20 is the head portion or head, of the piston, which is detachably secured to the body portion, as by screws 21 tapped into the bosses 16. This head has the usual grooves 22 for the reception of piston rings 23. 24 are depending skirts, or wear slippers, which are integral with the head and on diametrically opposite sides thereof. These skirts are arcuate, their outer diameter being the same or slightly larger than the piston head, and are adapted to lie in the grooves 18 in the body of the piston, and be supported by the bottoms of said grooves, being complementary to said body portion and when in place taking the thrust and wear incident to the side thrust of the connecting rod. In replacement the substitution of a head with thicker skirts compensates for both cylinder wear and piston wall wear. If desired the edges 25 of the skirts may be bevelled and the grooves correspondingly undercut to receive the bevelled edges. The side edges of the skirts 24 may be snugly fitted in the grooves 18 and if desired one or both of the skirts may be provided with a slot 26 extending the major portion of its length to provide for expansion. At their ends the skirts may be notched to receive lugs 27, which are integral with the body 20, these lugs serving to retain the skirts should skirt breakage occur. It will be understood however, that the side edges of the skirts may be loose in the grooves 18 and such looseness or play be utilized to care for expansion.

The center of the body 20 at its upper end preferably has a central open portion 28 through which the end of the connecting rod 13 may be examined after removal of the head 20. 29 are oil drainage holes leading from the bottom piston ring groove into the body of the piston. A tapped, blind hole 30 may be provided in the head 20 to receive a threaded member for removal of the head. 31 is the cylinder wall.

In making use of the present device, the head of the cylinder (not shown), is removed, and its piston shifted to bring the top of the piston as nearly as possible flush with the top of the cylinder wall 31. The screws 21, which may be bolts or studs with nuts thereon, are removed and the detachable head 20 with the rings 22 and skirts 24 are removed, leaving the body portion 10 of the piston still connected through the piston pin 12 to the connecting rod 13. If the trouble to be corrected is a broken or badly worn ring, or rings, the broken or worn rings are removed from the grooves, new rings are put in place and the head replaced and secured.

Usually however after removal of the head the piston is shifted to move it to the lower portion of the cylinder, thus leaving the major portion of the cylinder wall exposed so that it may be examined to determine if such wear has taken place as to necessitate an oversized head in addition to the rings. It will be noted particularly, that the piston with the head removed is so shortened that a much greater expanse of cylinder wall is uncovered than is uncovered during operation of the piston itself, and that all of the wall which is subject to scoring by the piston rings is uncovered. If it is found that such scoring is excessive, reboring may be accomplished in the usual manner. Or if as is usual, a slight shoulder has been formed in the cylinder at the upper end of the stroke, this may obviously be removed without difficulty. If reboring is done a new oversized head and skirts with oversized rings may be used with the old body, but if, as is often the case, shoulder removal only is done, a standard size head, with oversized skirts, and oversize rings are used with the old body as a replacement.

What I claim is:

1. A piston, comprising a body having integral piston pin bosses, at least the lower portion of said body being externally substantially cylindrical, said body being channeled on diametrically opposite sides substantially at right angles to the axial center line of said bosses to provide wide, shallow recesses, a complementary head, and means for removably securing said head to said body, said head being grooved for the reception of piston rings, and having integral oppositely disposed skirts depending therefrom, said skirts being complementary to said shallow recesses in said body and adapted to contact and be supported by the bottom of said recesses.

2. A piston, comprising a body having integral piston pin bosses, said body being externally substantially cylindrically arcuate below said bosses and being of less width on diametrically opposite sides substantially at right angles to the axial center line of said bosses, a complementary head, and means for removably securing said head to said body, said head being grooved for the reception of piston rings, and having integral oppositely disposed skirts depending therefrom, said skirts being complementary to the reduced width portions of said body and adapted to contact and be supported by said portions.

3. A piston, comprising a head portion, a complementary body portion and means for removably securing said head portion to said body portion, said head portion being grooved for the reception of piston rings, and having integral, oppositely disposed wear-skirts depending therefrom, said skirts being of substantially less width than the diameter of said head, said body portion having integral piston pin bosses, and being adapted to lie between and laterally support said skirts.

4. A piston, comprising a body having integral piston pin bosses, the upper portion of said body being centrally apertured, and at least the lower portion thereof being externally substantially cylindrical, said body being channeled on diametrically opposite sides substantially at right angles to the axial center line of said bosses to provide wide, shallow recesses, a complementary head adapted to form a closure for the upper end of said body, and means for removably securing said head to said body, said head being grooved for the reception of piston rings, and having integral, oppositely disposed skirts, depending therefrom, said skirts being complementary to said shallow recesses in said body and adapted to contact and be supported by the bottom of said recesses.

5. A piston comprising a body having integral piston pin bosses, a complementary head, and means for detachably securing said head to said body; said head being grooved for the reception of piston rings and having depending wear-skirts supported by the laterally opposite sides of said body, said skirts being of substantially less width than the diameter of said head.

6. A piston in accordance with claim 5, in which the body portion has projecting portions below the end portions of said skirts.

GEORGE Q. BRITT.